UNITED STATES PATENT OFFICE.

EDWARD THOMAS, OF WORCESTER, MASSACHUSETTS.

CEMENT AND CONCRETE WORK.

958,336.    Specification of Letters Patent.    Patented May 17, 1910.

No Drawing.    Application filed November 29, 1909.    Serial No. 530,387.

*To all whom it may concern:*

Be it known that I, EDWARD THOMAS, a citizen of the United States, residing at Worcester, in the county of Worcester and State of Massachusetts, have invented an Improvement in Cement and Concrete Work, of which the following is a specification.

My invention relates to cements of the general nature of Portland cement and especially to rendering plaster and concrete made with these more waterproof, though other advantages will be pointed out or be obvious to those skilled in the art.

It is well known that Portland cement when agitated with many times its weight of water for some time, becomes a flaky gelatinous precipitate that is greatly increased in bulk. Cement treated in this way is known as colloidal cement and ordinarily will not set except under pressure. Now I have discovered that if this colloidal cement is mixed with untreated cement and water (with the addition of sand etc. if desired) the concrete when hard is waterproof in practical work, though small thin test pieces are often very porous. For example on one job to every gallon of water used was added six ounces of cement, this was stirred till all the cement had become colloidal. The water containing this colloidal cement was kept well stirred up and used for wetting a 1:3 mixture of untreated cement and sand. The resulting mortar was plastered on a leaky cellar wall (two coats each about ⅜ inch thick) and when hard the wall was found waterproof. Pumps were kept going in wells sunk just outside the wall so as to relieve the water pressure during the plastering.

I have found by experiment that the greatest bulk of colloidal cement is obtained when not less than 4 and not more than 6 ounces avoirdupois of cement is used to each U. S. standard gallon of water. If more is used there is less colloid obtained. If more colloidal cement is wanted a second lot of 6 oz. per gallon can be added after the first has become colloidal, and this will increase the amount if stirred in the same way. Also I have found that if certain substances are dissolved in the water before the cement is added a more bulky mass of colloidal cement is obtained. In practical commercial work I believe about 2½% of common salt in the water will prove the most effective. The temperature of the mixing water greatly affects the time necessary to make the cement colloidal. At about 65 Fahrenheit nine minutes often suffices. Colder water requires more time and warmer water less.

It has been found that plaster mixed as above described works far smoother under the trowel and less cement is needed in mortar made with very sharp sand than ordinarily. It has further been found that concrete composed of sand, cement and broken stone can be rendered waterproof by mixing in this colloidal cement just as I have described the making of mortar above. Another great advantage of my invention is that it adds a waterproofing agent without adding any foreign substance which will injure the setting power of cement or cause it to deteriorate by lapse of time.

I am aware that other colloids have been proposed as waterproofing agent, but many of these are known to detract from the strength of the cement, and it likely that they all do. My invention on the contrary adds to the strength of cement in the early stages of hardening, and thus adds to the usefulness of cement. This valuable property is shown in the following table which shows the comparative strength of briquets mixed in the ordinary way, and those mixed by my colloidal process. The briquets were one to three sand and cement and broken at the dates given in the table.

|  | Plain water. | Colloidal water. |
|---|---|---|
| 7 days | 395 lbs. | 470 lbs. |
| Do | 410 | 480 |
| Do | 420 | 415 |
| Average | 408 | 443 |
| 28 days | 520 | 525 |
| Do | 480 | 480 |
| Do | 525 | 490 |
| Average | 508 | 498 |
| Six months | 500 | 500 |
| Do | 570 | 575 |
| Do | 580 | 600 |
| Average | 550 | 558 |

It has been found that cement which has been exposed to the air in very thin layers will not always become colloidal and so cannot be used as I have described. Slag cement seems to work fully as well as true Portland, but Rosendale or American natural cement sometimes fails to become colloidal, and when that is the case cannot be used in my process.

In the above the directions are given for the ordinary Portland cement of commerce containing sulfate of lime to regulate the setting.

While I have described what I believe the most practical method of work, various modifications can be adopted, such as filtering off the water and adding the colloidal cement separately to untreated cement or to a mixture containing untreated cement or to water that already contains colloidal cement. The colloidal cement must not be allowed to dry however.

What therefore I claim is:

1. A composition comprising colloidal cement and untreated cement.

2. A composition comprising colloidal cement, untreated cement and a filler.

3. The process of making mortar which consists in adding cement to water, rendering the cement colloidal and adding the mixture to untreated cement.

4. The process of making concrete which consists in adding cement to water, rendering the cement colloidal and adding this cement to untreated cement and a filler.

5. The process of rendering cement colloidal which consists in agitating it in a dilute aqueous solution containing more than one fifth of one per cent. of matter adapted to modify the action of water on the cement.

6. The process of rendering cement colloidal which consists in agitating it in water till colloidal, adding more cement and agitating the whole.

In testimony whereof I have signed my name in the presence of two witnesses.

EDWARD THOMAS.

Witnesses:
 ALLEN C. THOMAS,
 LOLA M. MORRIS.